US006982381B1

(12) United States Patent
Backofen et al.

(10) Patent No.: US 6,982,381 B1
(45) Date of Patent: Jan. 3, 2006

(54) WEATHER RESISTANT ELECTRICAL ENCLOSURE

(75) Inventors: Paul J. Backofen, Upland, CA (US); Redwald Villanueva, Los Angeles, CA (US)

(73) Assignee: Orbit Industries, Inc., Los Angeles, CA (US)

( * ) Notice: Subject to any disclaimer, the term of this patent is extended or adjusted under 35 U.S.C. 154(b) by 0 days.

(21) Appl. No.: 11/144,144

(22) Filed: Jun. 3, 2005

(51) Int. Cl.
  *H02G 3/14* (2006.01)
(52) U.S. Cl. ............................ 174/67; 174/66; 220/242
(58) Field of Classification Search .................. 174/66, 174/67, 50; 220/241, 242, 4.02; D8/353; D13/177
See application file for complete search history.

(56) References Cited

U.S. PATENT DOCUMENTS

| | | | |
|---|---|---|---|
| 6,265,662 B1 * | 7/2001 | Riedy et al. ................... | 174/67 |
| 6,653,566 B2 * | 11/2003 | Petak et al. ..................... | 174/66 |
| 6,765,149 B1 * | 7/2004 | Ku .............................. | 174/66 |
| 6,806,425 B1 * | 10/2004 | O'Neill ....................... | 174/66 |
| 6,806,426 B1 * | 10/2004 | Gretz .......................... | 174/67 |
| 6,852,929 B2 * | 2/2005 | Scudder ........................ | 174/66 |

* cited by examiner

*Primary Examiner*—Dhiru R. Patel
(74) *Attorney, Agent, or Firm*—Paul J. Backofen, Esq.; Crockett & Crockett

(57) ABSTRACT

A weather resistant electrical enclosure or box cover according to the present disclosure provides a generally rectangular box composed of three pair of parallel sides enclosing a protected space. The mounting assembly includes a mounting surface with a mounting frame, the mounting surface is contiguous with a generally parallel upper and lower surfaces. A cover assembly includes a cover surface contiguous with left and right side surfaces, the side surfaces engage mounting flanges of the first key surface to enable the cover assembly to open and close to complete the enclosure. The mounting frame includes a sealing channel along each of two surface sides, each of the sealing channels including two parallel baffles that engage a mating baffle on each of the left and right side surfaces. The lower surface includes two or more cord control arms. The upper surface may be slightly sloped from perpendicular to the first key surface to prevent condensation and capillary flows from dripping onto the electrical interface or cords engaged thereto and may also include an internal condensation and splash barrier.

6 Claims, 6 Drawing Sheets

WEATHER RESISTANT ELECTRICAL ENCLOSURE

BACKGROUND OF THE INVENTION

1. Field of the Invention

The present invention relates generally to the field of electrical construction accessories and more specifically to weather resistant electrical enclosures.

2. Description of the Prior Art

Electrical junction boxes, the metal or plastic container used to isolate electrical outlets and their wire connections may need weatherproof covers when they are installed to be accessible from the outside of a building or other support structure. Historically, covers for outside electrical outlets included one or more hinged flaps to cover the outlet receptacles or switches.

Conventional weather resistant electrical covers only provide partial relief from direct water ingress with one or more cords connected to the outlet receptacles.

What is needed is a weather resistant electrical box enclosure that includes cord controls, interleaved baffles and interior drip resistance.

SUMMARY OF THE INVENTION

A weather resistant electrical enclosure or box cover according to the present disclosure provides a generally rectangular box composed of three pair of parallel sides enclosing a protected space. The mounting assembly includes a mounting surface with a mounting frame, the mounting surface is contiguous with a generally parallel upper and lower surfaces. A cover assembly includes a cover surface contiguous with left and right side surfaces, the side surfaces engage mounting flanges of the first key surface to enable the cover assembly to open and close to complete the enclosure. The mounting frame includes a sealing channel along each of two surface sides, each of the sealing channels including two parallel baffles that engage a mating baffle on each of the left and right side surfaces. The lower surface includes two or more cord control arms. The upper surface may be slightly sloped from perpendicular to the first key surface to prevent condensation and capillary flows from dripping onto the electrical interface or cords engaged thereto and may also include an internal condensation and splash barrier.

In a first aspect, the present disclosure provides a weather resistant enclosure including three interleaved baffles protecting the side and top engagement seams. The enclosure may also include an upper surface having a stop edge to engage the cover surface when the cover is fully opened, permitting unimpeded access to the protected space.

In another aspect of the present disclosure, a weather resistant enclosure may include cord engagement and control elements to permit an electrical plug to be inserted into and electrical outlet protected by the weather resistant enclosure, and the cord connected to the electrical plug may be engaged by the control elements to provide strain relief for the cord and to permit the cover assembly to be easily opened and closed without the need to use handle or otherwise control the cord or cords while opening or closing the weather resistant enclosure.

In another aspect of the present disclosure, the side surfaces overlap the bottom surface. In addition, the control elements of the bottom surface permit ventilation through the control elements and the overlapping side surfaces. The bottom surface ventilation permits any moisture within the protected space to drain and air to circulate to prevent condensation in extreme conditions.

In the event condensation forms on the interior surface of the top side, the slope of the top surface and the interior drip baffle will encourage condensation to drip at a distance from the mounting surface and any plugs or other electrical elements there.

These and other features and advantages will become further apparent from the detailed description and accompanying figures that follow. In the figures and description, numerals indicate the various features of the disclosure, like numerals referring to like features throughout both the drawings and the description.

DETAILED DESCRIPTION OF THE PREFERRED EMBODIMENT(S)

Figure 1:
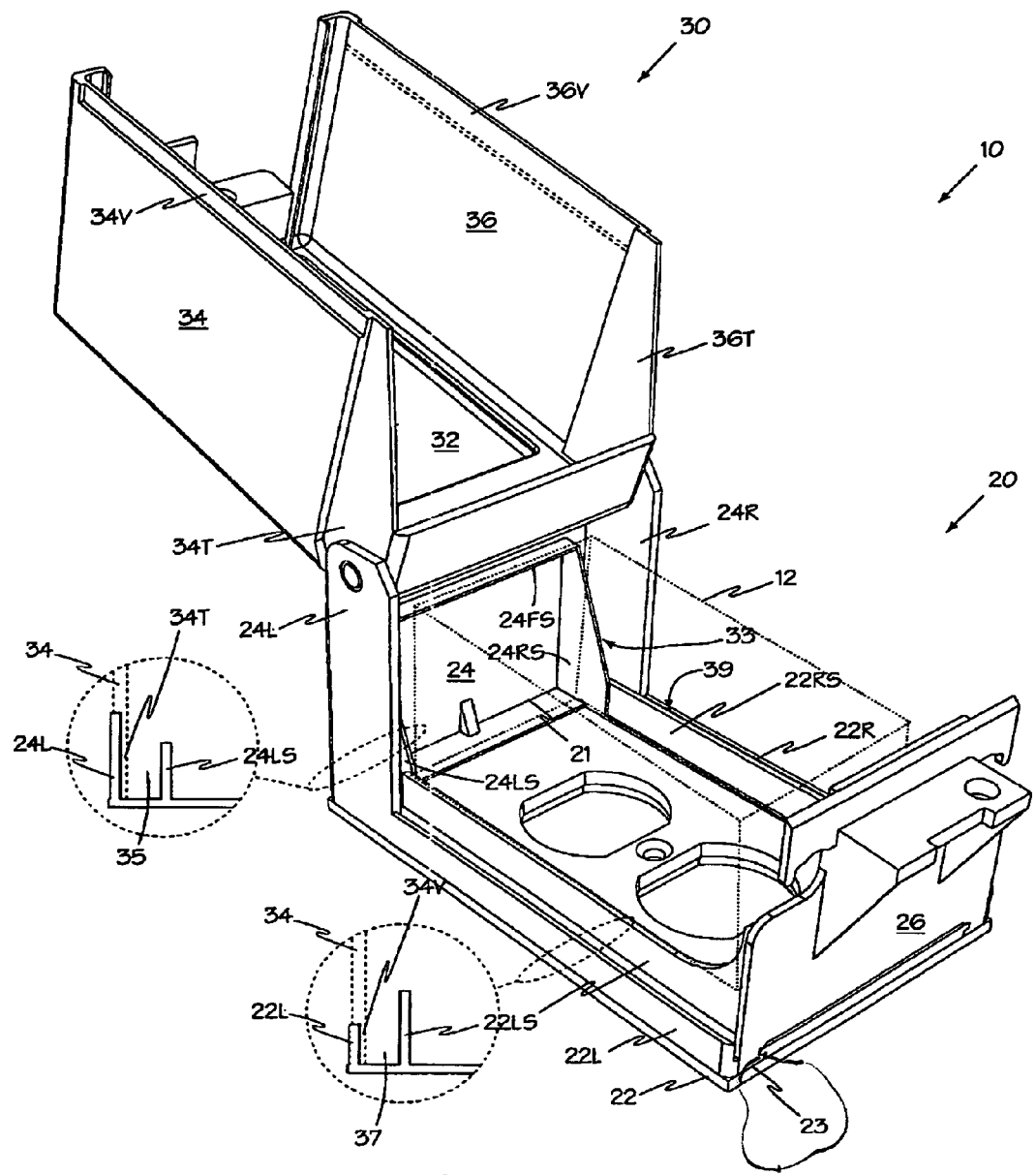
FIG. 1 is a perspective view of an open weather resistant electrical enclosure according to the present disclosure.

Referring now to FIG. 1, weather resistant enclosure 10 encloses a generally rectangular space, protected space 12. Weather resistant enclosure 10 includes two assemblies, mounting assembly 20 and cover assembly 30. Mounting assembly 20 includes three contiguous sides or elements, mounting side or element 22, top side or element 24 and bottom side or element 26. The mounting element joins the top side along top common edge 21 and the mounting element joins the bottom element along bottom common edge 23. Cover assembly 30 includes three contiguous elements or sides that engage elements or sides 22, 24, and 26 of mounting assembly 20. Cover assembly 30 includes front element or side 32, first element or side 34 and second element or side 36.

Weather resistant enclosure 10 further includes a plurality of interleaved baffles to limit the incursion of liquid or particulates into protected space 12. First side 34 includes top baffle 34T and side baffle 34V. Top baffle 34T is interleaved in baffle channel 35, between top primary baffle 24L and top secondary baffle 24LS when cover assembly 30 is closed. Side baffle 34V is interleaved in baffle channel 37, between first primary baffle 22L and first side secondary baffle 22LS.

Top side 24 includes interior baffle screen 28 formed by the combination of top secondary baffles 24LS, 24FS, and 24RS.

Second side 36 includes top baffle 36T and side baffle 36V. Top baffle 36T is interleaved in baffle channel 33, between top primary baffle 24R and top secondary baffle 24RS when cover assembly 30 is closed. Side baffle 36V is interleaved in baffle channel 39 between first primary baffle 22R and second side secondary baffle 22RS.

Figure 2:
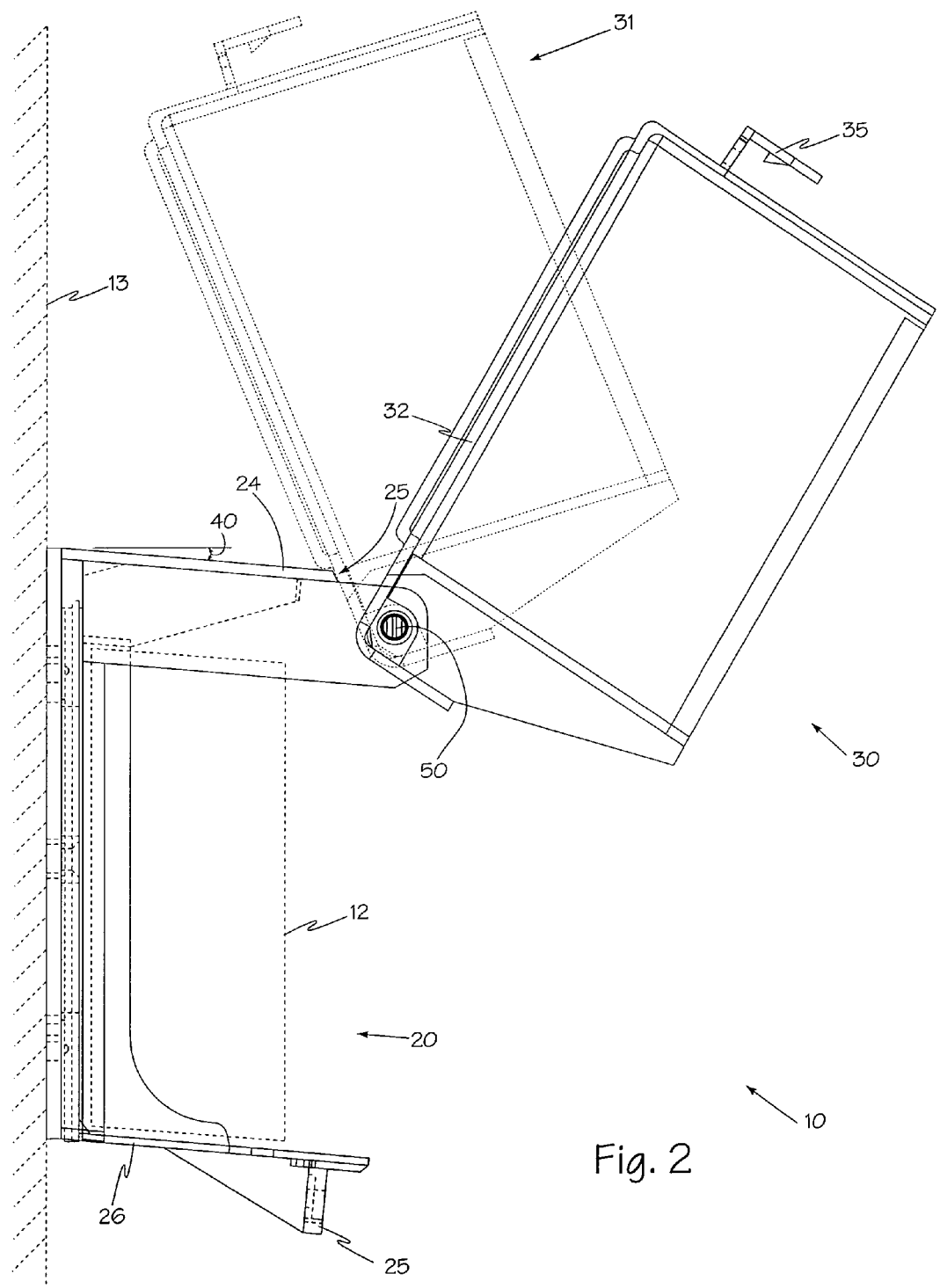
FIG. 2 is a side view of the weather resistant electrical enclosure of FIG. 1.

Referring now to FIG. 2, cover assembly 30 is shown open and position 31 is fully open. In position 31, front side 32 engages top side 24 at stop edge 25. Stop edge 25 permits cover assembly 30 to be in position 31 without cover assembly 30 making contact with plane 13. This configuration enables a user to rotate cover assembly 30 about pivot pins 50 into fully open position 31. Cover assembly 30 will remain in fully open position 31 until a user changes the position of cover assembly 30.

Top side 24 may be sloped at an angle 40 to prevent liquid from remaining on top side 24. Sloping top side 24 will also permit any condensation that may occur within weather resistant enclosure 10 to flow away from mounting side 22. Bottom side 26 may also be sloped to remain generally parallel to top side 24 and to encourage drainage. Latch 35 may also be included on cover assembly 30. Latch 35 may engage stop edge 25 of bottom side 26 to secure cover assembly 30 closed as shown in FIG. 3.

Figure 3:
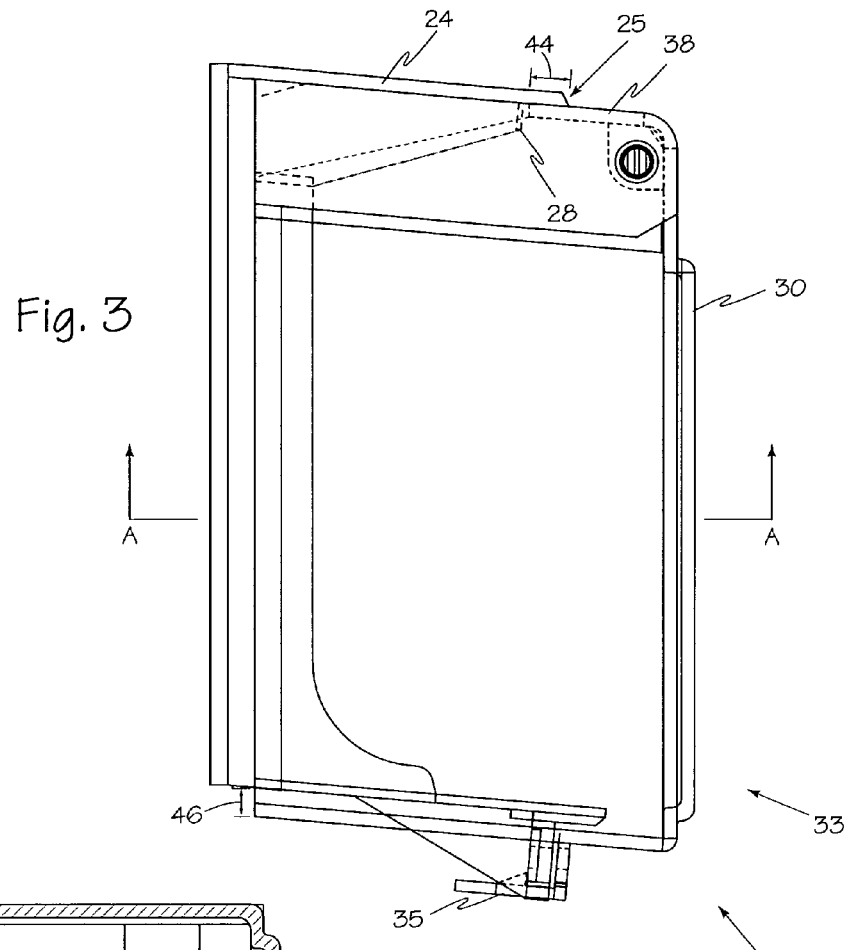
FIG. 3 is a side view of a closed weather resistant electrical enclosure according to the present disclosure.

Referring now to FIG. 3, cover assembly 30 is shown in closed position 33. In closed position 33, overlap 46 between first side 34 and bottom side 26, and between second side 36 and bottom side 26 is illustrated. Cover assembly 30 also includes baffle 38 which is generally parallel to top side 24 in closed position 33.

Overlap 44 between top side 24 and baffle 38 shields protected space 12. The length of overlap 44 may be adjusted to minimize capillary conduction of fluids such as water or any expected fluid into weather resistant enclosure 10. Any fluid that flowed against the slope 40 into weather resistant enclosure 10 would encounter inner baffle shield 28 which is composed of top secondary baffles 24LS, 24RS, and 24FS. The combination of slope of top side 24, inner baffle shield 28 and gravity will prevent fluid from contacting protected space 12 and any electrical elements therein.

Figure 4:
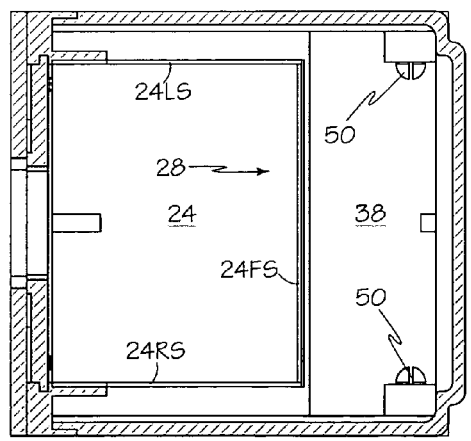
FIG. 4 is a cross section view of the closed weather resistant electrical enclosure of FIG. 3 taken along A–A'.

Referring now to FIG. 4, pivot pins 50 may be press fit pins as shown, or any other suitable connector may be used.

Figure 5:
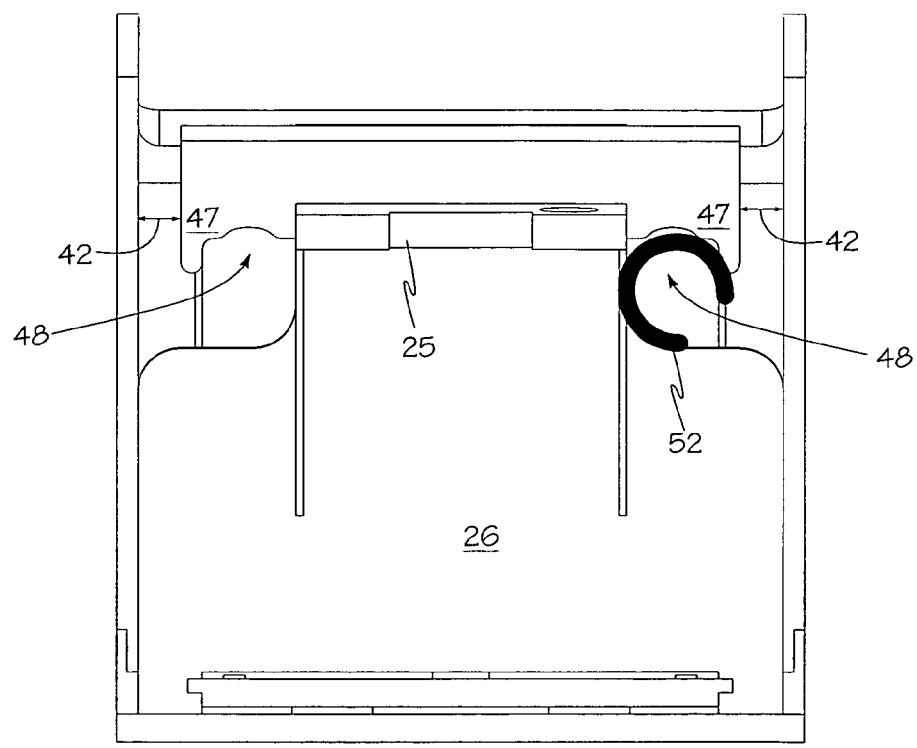
FIG. 5 is a view of the bottom side of the weather resistant electrical enclosure of FIG. 1.

Referring now to FIG. 5, bottom side 26 may also include one or more cord control elements 47. Cord control elements engage one or more electrical cords in cord aperture 48. Cord aperture 48 may also include a cord ring such as cord ring 52 to provide abrasion resistance and further secure a cord in cord aperture 48. Ventilation access 42 permits air or other gas to circulate within weather resistant enclosure 10 to prevent excessive heat or moisture accumulation within protected space 12.

Figure 6:
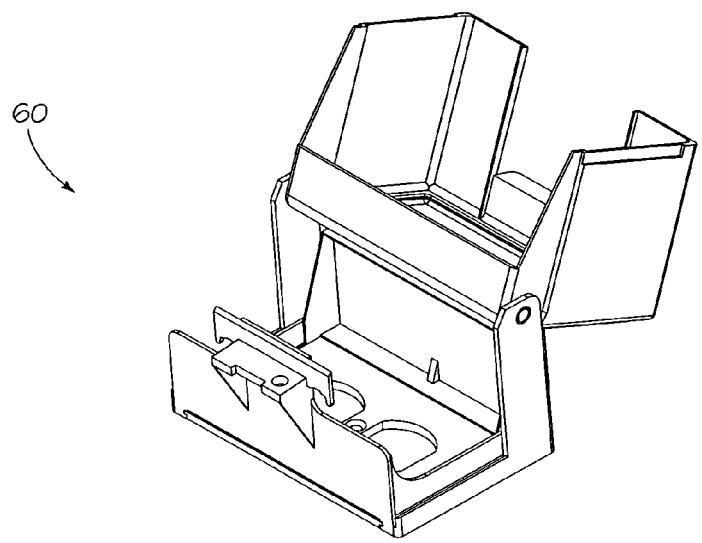
FIG. 6 is a perspective view of an open weather resistant electrical enclosure according to an alternate configuration of the present disclosure.
Figure 7:
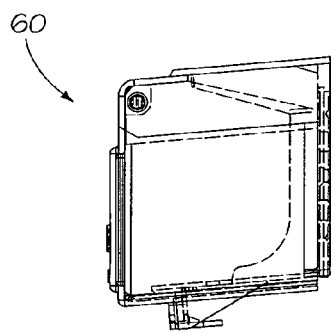
FIG. 7 is a side view of a closed weather resistant electrical enclosure according to the present disclosure.
Figure 8:
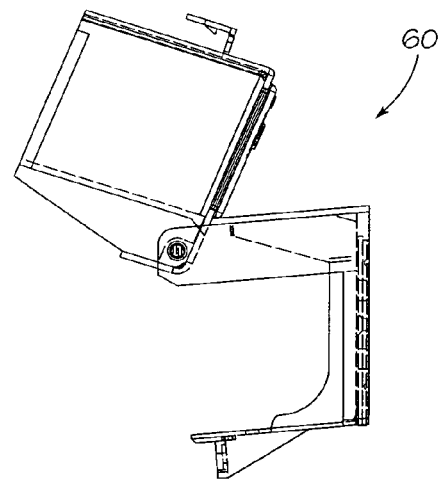
FIG. 8 is a side view of the weather resistant electrical enclosure of FIG. 6.

Referring now to FIGS. 6, 7, and 8, in an alternate configuration of a weather resistant enclosure, weather resistant enclosure 60 enables an alternate orientation of an electrical outlet.

Figure 9:
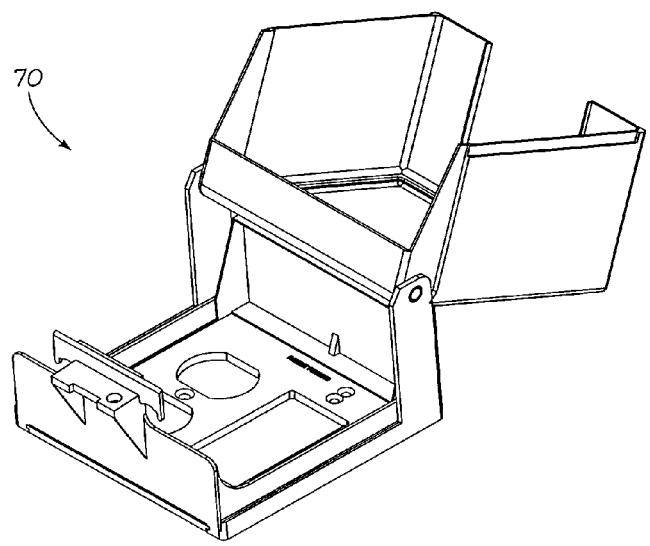
FIG. 9 is a perspective view of an open weather resistant electrical enclosure according to an alternate configuration of the present disclosure.
Figure 10:
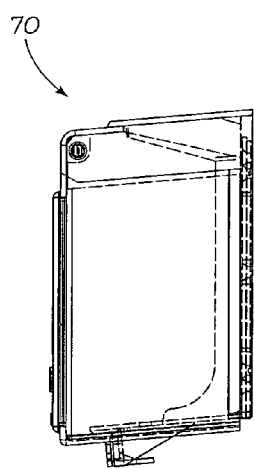
FIG. 10 is a side view of a closed weather resistant electrical enclosure according to the present disclosure.
Figure 11:
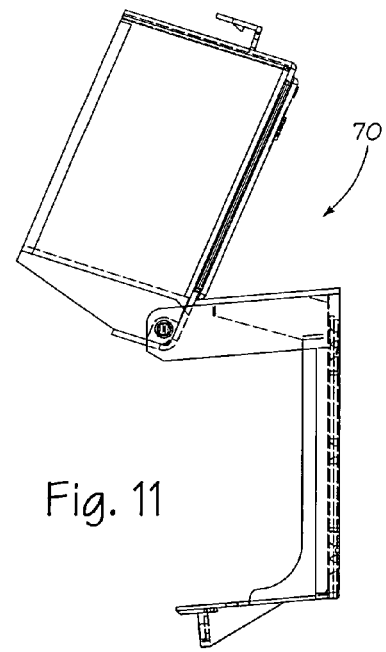
FIG. 11 is a side view of the weather resistant electrical enclosure of FIG. 9.

Referring now to FIGS. 9, 10, and 11, in an alternate configuration of a weather resistant enclosure, weather resistant enclosure 70 enables protection of a two-gang electrical interface.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. An electrical enclosure comprising:
    a mounting assembly having a mounting element joined along a top common edge and generally perpendicular to a top element, the mounting element joined along a bottom common edge a generally perpendicular to a bottom element, the mounting element having a first baffle channel along a first edge extending between the top element and the bottom element, and a second baffle channel along a second edge extending between the top element and the bottom element, the first edge parallel to the second edge;
    a cover assembly having a front element contiguous with and generally perpendicular to a first element and a second element, the first element and the second element pivotally attaching the cover assembly to the mounting assembly with the front element parallel to the mounting element; the first and the second elements each having a top edge baffle and a side baffle; and
    the side baffle of the first side, engaging the first baffle channel, and the side baffle of the second side, engaging the second baffle channel.

2. The electric enclosure of claim 1 wherein the top element further comprises:
    a generally rectangular top element having a top common edge generally parallel to a front edge, a first edge between the top common edge and the front edge and generally parallel to a second edge also between the top common edge and the front edge;
    a first upper baffle channel extending from the top common edge to the front edge;
    a second upper baffle channel extending from the top common edge to the front edge, the; and
    an inner baffle shield extending perpendicular to the top element toward the bottom element.

3. The electric enclosure of claim 2 further comprising:
    an upper baffle on the first element engaging the first upper baffle channel; and
    an upper baffle on the second element engaging the second upper baffle channel.

4. The electric enclosure of claim 1 further comprising:
    a generally rectangular bottom element having one or more cord control means for engaging one or more cords.

5. The electric enclosure of claim 1 wherein the cover assembly is transparent.

6. An electrical enclosure comprising:
    a first side and a parallel second side, the first side having an upper baffle and a side baffle, the second side having an upper baffle and a side baffle;
    a top side and a parallel bottom side, the top side having an common edge and a front edge and a first baffle channel along a first edge extending from the common edge to the front edge, and a second baffle channel along a second edge extending from the common edge to the front edge;
    a mounting side and a parallel front side, the mounting side having an upper edge and a lower edge and a first baffle channel along a first edge extending from the upper edge to the lower edge, and a second baffle channel along a second edge extending from the upper edge to the lower edge;
    a mounting assembly having the mounting side contiguous with and generally perpendicular to the top side and the bottom side;

a cover assembly having the front side contiguous with and generally perpendicular to the first side and the second side, the first side and the second side pivotally attaching the cover assembly to the mounting assembly with the front surface parallel to the mounting surface and the first side upper baffle engaging the top side first baffle channel, and the second side upper baffle engaging the top side second baffle channel, the side baffle of the first side, engaging the mounting side first baffle channel, and the side baffle of the second side, engaging the mounting side second baffle channel; and one or more cord control means on the bottom side.

* * * * *